(12) United States Patent
Gawade et al.

(10) Patent No.: US 11,312,308 B2
(45) Date of Patent: Apr. 26, 2022

(54) UNIVERSAL STORAGE SYSTEM FOR A MOTOR VEHICLE

(71) Applicant: GM Global Technology Operations LLC, Detroit, MI (US)

(72) Inventors: Tushar R. Gawade, Maharashtra (IN);
Sujit Venugopal, Bengaluru (IN); Rajiv M. Nagarkatti, Kundalahalli (IN);
Biswajit Tripathy, Banglore (IN);
Sadanand N. Raikar, Bengaluru (IN)

(73) Assignee: GM Global Technologies Operations LLC, Detroit, MI (US)

( * ) Notice: Subject to any disclaimer, the term of this patent is extended or adjusted under 35 U.S.C. 154(b) by 331 days.

(21) Appl. No.: 16/678,441

(22) Filed: Nov. 8, 2019

(65) Prior Publication Data

US 2021/0138963 A1 May 13, 2021

(51) Int. Cl.
  *B60R 5/00* (2006.01)
  *B60R 5/04* (2006.01)
  *G06F 3/04847* (2022.01)
  *B60R 11/00* (2006.01)

(52) U.S. Cl.
  CPC .............. *B60R 5/00* (2013.01); *B60R 5/045* (2013.01); *B60R 5/044* (2013.01); *B60R 2011/0092* (2013.01); *B60R 2011/0098* (2013.01); *B60R 2325/20* (2013.01); *G06F 3/04847* (2013.01)

(58) Field of Classification Search
  CPC . B60R 5/045; B60R 5/044; B60R 2011/0092; B60R 2011/0098; B60R 2325/20; B60R 5/00; B60R 7/02
  USPC ......................................................... 296/37.8
  See application file for complete search history.

(56) References Cited

U.S. PATENT DOCUMENTS

| | | | | |
|---|---|---|---|---|
| 7,184,266 B1 * | 2/2007 | Chen | .................... | B60R 11/0235 312/196 |
| 9,783,116 B2 * | 10/2017 | Huebner | .................... | B60R 5/04 |
| 10,358,173 B2 * | 7/2019 | Gussen | ................ | B60R 21/026 |
| 10,384,593 B2 * | 8/2019 | Altobelli | ................. | B60R 7/005 |
| 10,414,344 B1 * | 9/2019 | Northcott | ................ | B60R 16/00 |
| 10,946,801 B2 * | 3/2021 | Putcha | .................... | B60R 5/045 |
| 11,036,265 B2 * | 6/2021 | Shelnutt | ................ | F24F 5/0046 |
| 11,072,290 B2 * | 7/2021 | Harmelink | .............. | B60R 7/005 |

(Continued)

FOREIGN PATENT DOCUMENTS

DE 102019125109 A1 3/2021

*Primary Examiner* — Jason S Morrow
(74) *Attorney, Agent, or Firm* — Vivacqua Crane PLLC (57) ABSTRACT

A universal storage system for a motor vehicle includes an enclosure defining a chamber, a plurality of partitions, and a partition actuator for moving the partitions within the chamber to define a plurality of compartments. The system further includes a cover actuator for moving the cover elements to cover the compartments. The system further includes a user interface generating a deposit signal indicative of a size of an object to be deposited into the enclosure. The system further includes a controller generating first and second actuation signals. The partition actuator moves the partitions to the predetermined positions to define a compartment sized for receiving the object in response to receiving the first actuation signal from the controller. The cover actuator moves the cover elements to the predetermined locations for uncovering the compartment in response to receiving the second actuation signal from the controller.

20 Claims, 7 Drawing Sheets

(56) References Cited

U.S. PATENT DOCUMENTS

| | | | | |
|---|---|---|---|---|
| 2015/0338154 A1* | 11/2015 | Senf | ................ | F25D 29/003 |
| | | | | 62/196.1 |
| 2016/0334142 A1* | 11/2016 | Senf, Jr. | ................ | F25B 49/02 |
| 2017/0096294 A1* | 4/2017 | Johnson | ................ | A47B 5/06 |
| 2018/0368352 A1* | 12/2018 | Smith | ................ | A01K 1/0064 |
| 2019/0344699 A1* | 11/2019 | Radetzki | ................ | B60R 25/252 |
| 2020/0114873 A1* | 4/2020 | Walden | ................ | B60R 5/045 |
| 2021/0146844 A1* | 5/2021 | Smith | ................ | A47C 17/80 |
| 2021/0304127 A1* | 9/2021 | Yamamoto | ................ | B60R 11/00 |
| 2021/0309132 A1* | 10/2021 | Plank S | ................ | B60N 2/36 |
| 2021/0316651 A1* | 10/2021 | Caron | ................ | B60P 1/00 |

* cited by examiner

UNIVERSAL STORAGE SYSTEM FOR A MOTOR VEHICLE

INTRODUCTION

The present disclosure relates to a storage system for a motor vehicle, and more particularly, to a universal storage system with partitions that are movable for defining compartments adapted to hold a plurality of objects.

Automotive manufacturers are investigating improvements to vehicles used in the ridesharing industry. Peer-to-peer ridesharing companies provide shared transportation for multiple passengers with their respective luggage, for the delivery of packages, or combinations thereof. Existing vehicles can hold luggage, packages, and other items in the trunk, frunk, passenger cabin, or other areas of the vehicle. The available space in these areas may not accommodate the luggage of a passenger, particularly when other passengers previously boarded the vehicle with luggage that does not leave room for the luggage of new passengers. In addition, passengers who arrive at their destination have access to the vehicle for unloading their luggage and potentially the luggage of other passengers without the permission or knowledge of those passengers.

Thus, while storage systems of motor vehicles achieve their intended purpose, there is a need for a new and improved storage system of motor vehicles that addresses these issues.

SUMMARY

According to several aspects of the present disclosure, a universal storage system for a motor vehicle is provided. The system includes an enclosure defining a chamber and a plurality of partitions movable within the chamber for defining one or more compartments. The system further includes a partition actuator coupled to the partitions for moving the partitions within the chamber. The system further includes a cover mechanism having a frame and two or more cover elements movable relative to the frame for covering the compartments. The system further includes a cover actuator for moving the cover elements. In addition, the system also includes a user interface generating a deposit signal indicative of a size of an object to be deposited into the enclosure. The system includes a controller configured to receive the deposit signal from the user interface. The controller is configured to generate a first actuation signal associated with a plurality of predetermined positions of the partitions to define a compartment that is sized for receiving the object. In response to the partition actuator receiving the first actuation signal from the controller, the partition actuator moves the partitions to the predetermined positions. The controller is further configured to generate a second actuation signal associated with a plurality of predetermined locations of the cover elements for uncovering the compartment used for holding the object. In response to the cover actuator receiving the second actuation signal from the controller, the cover actuator moves the cover elements to the predetermined locations.

In one aspect, the enclosure comprises one or more surfaces defining the chamber, with the partitions connected to the surfaces and displaceable along those surfaces.

In another aspect, the surfaces that define the chamber includes a top surface, a bottom surface spaced from the top surface, a rear wall surface extending between the top and bottom surfaces, and first and second side wall surfaces extending between the top and bottom surfaces. Furthermore, the partitions include a first panel connected to the top surface and displaceable along the top surface, a second panel connected to the bottom surface and displaceable along the bottom surface, a third panel connected to the first sidewall surface and displaceable along the first sidewall surface, and a fourth panel connected to the second sidewall surface and displaceable along the second sidewall surface.

In another aspect, the partition actuator includes a plurality of sliding drive elements coupled to an associated one of the first, second, third, and fourth panels, for displacing the same along an associated one of the top, bottom, and first and second sidewall surfaces.

In another aspect, the cover elements includes a first tambour door movable relative to the frame along a first direction and a second tambour door movable relative to the frame along a second direction where the first direction is angularly spaced from the second direction such that the first and second tambour doors are movable for covering one or more of the compartments.

In another aspect, the cover actuator includes first and second door drive elements for moving an associated one of the first and second tambour doors.

In another aspect, the first, second, third, and fourth panels are configured to move angularly relative to an associated one of the top surface, the bottom surface, the first sidewall surface, and the second sidewall surface.

In another aspect, the partition actuator includes a plurality of pivoting drive elements coupled to an associated one of the first, second, third, and fourth panels for angularly moving the same relative to an associated one of the top, bottom, and first and second sidewall surfaces.

In another aspect, each of the first, second, third, and fourth panels includes a first plate and a second plate coupled to the first plate. The second plate is movable between a retracted position and an extended position relative to the first plate for changing a length of the associated panel.

In another aspect, the partition actuator includes an extension drive element coupled to the second plate for moving the second plate between the retracted position and the extended position.

According to several aspects of the present disclosure, a universal storage system for a motor vehicle is provided. The system includes an enclosure defining a chamber and a plurality of partitions movable within the chamber for defining one or more compartments. The system further includes a partition actuator coupled to the partitions for moving the partitions within the chamber. The system further includes a cover mechanism having a frame and two or more cover elements movable relative to the frame for covering the compartments. The system further includes a cover actuator for moving the cover elements. In addition, the system also includes a user interface that generates a deposit signal indicative of a size of an object to be deposited into the enclosure. The system includes a controller configured to receive the deposit signal from the user interface. The controller is configured to generate a first actuation signal associated with a plurality of predetermined positions of the partitions to define a compartment that is sized for receiving the object. In response to the partition actuator receiving the first actuation signal from the controller, the partition actuator moves the partitions to the predetermined positions. The controller is further configured to generate a second actuation signal associated with a plurality of predetermined locations of the cover elements for uncovering the compartment used for holding the object. In response to the cover actuator receiving the second actuation signal from the controller, the cover actuator moves the cover elements to the predetermined locations. The controller is further configured to generate a compartment access code associated with the second actuation signal and transmit the compartment access code to a sender and a recipient. The user interface is configured to generate a retrieve signal in response to receiving the compartment access code from the recipient, and the controller is configured to generate the second actuation signal in response to receiving the retrieve signal from the user interface.

In one aspect, the controller is configured to compare the size of the object to available space in the chamber, in response to the controller receiving the deposit signal. The controller generates the first actuation signal in response to the controller determining that the object can be received within the available space of the chamber.

In another aspect, the enclosure has one or more surfaces defining the chamber, and the partitions include one or more panels connected to the enclosure and displaceable along the associated surfaces.

In another aspect, the panels are further angularly movable relative to the at least one surface.

In another aspect, each of the panels includes a first plate and a second plate coupled to the first plate. The second plate is movable between a retracted position and an extended position relative to the first plate for changing the length of the panel.

According to several aspects of the present disclosure, a method for operating a universal storage system for a motor vehicle is provided. The system includes an enclosure defining a chamber, a plurality of partitions, a partition actuator, a cover mechanism, a cover actuator, a user interface, and a controller. The user interface generates a deposit signal indicative of a size of an object to be deposited into the enclosure, and the controller receives the deposit signal from the user interface. The controller generates a first actuation signal associated with a plurality of predetermined positions of the partitions to define a compartment that is sized for receiving the object. In response to the partition actuator receiving the first actuation signal from the controller, the partition actuator moves the partitions to the predetermined positions. The controller generates a second actuation signal associated with a plurality of predetermined locations of the cover elements for uncovering the compartment used for holding the object. In response to the cover actuator receiving the second actuation signal from the controller, the cover actuator moves the cover elements to the predetermined locations.

In one aspect, the controller compares the size of the object to available space in the chamber, in response to the controller receiving the deposit signal. The controller generates the first actuation signal in response to the controller determining that the object can be received in the available space of the chamber.

In another aspect, the controller generates a compartment access code associated with the second actuation signal, and the user interface transmits the compartment access code to a sender and a recipient.

In another aspect, the user interface transmits the deposit signal to the controller in response to the user interface receiving the compartment access code from the sender. The controller generates the second actuation signal such that the sender is capable of depositing the object in the compartment, in response to the controller receiving the deposit signal from the user interface.

In another aspect, the user interface generates a retrieve signal in response to the user interface receiving the compartment access code from the recipient. The controller generates the second actuation signal such that the recipient is capable of retrieving the object from the compartment, in response to the controller receiving the retrieve signal from the user interface.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

Figure 1:
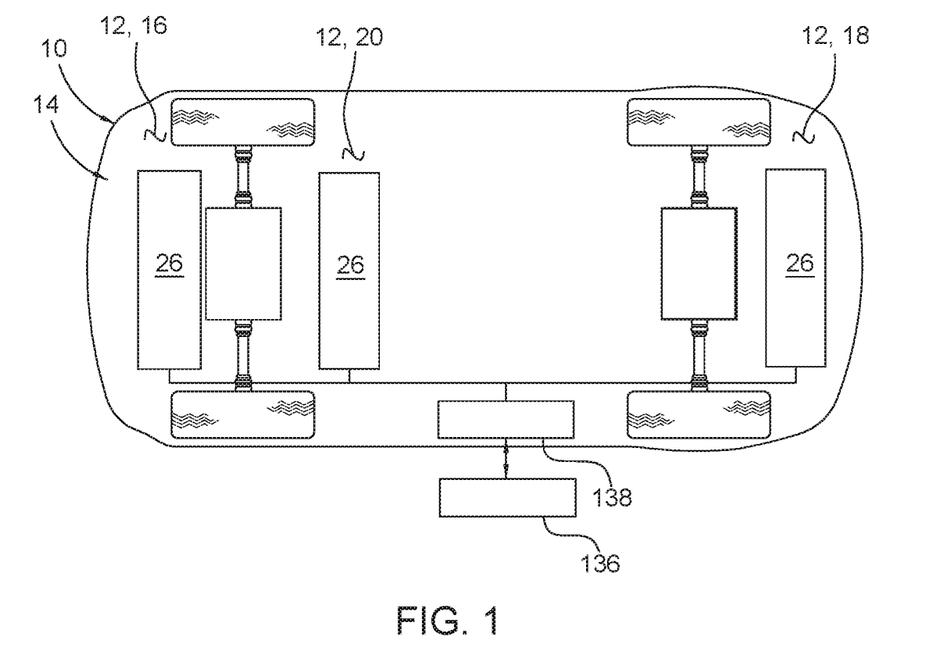
FIG. 1 is a schematic view of a motor vehicle having multiple universal storage systems.

Referring to FIG. 1, there is generally illustrated a motor vehicle 10 having multiple storage areas 12 and a universal storage system 14 ("system") having enclosures 26 integrated within each of the storage areas 12. In this example, the vehicle 10 is a four-passenger car having storage areas 12 in the form of a trunk 16, a frunk 18, and a backseat 20. The system 14 is integrated within each of the trunk 16, the frunk 18, and the backseat 20, for securely transporting luggage, parcels, or other objects from a sender to a recipient in various peer-to-peer ridesharing and parcel delivery applications. It is contemplated that the vehicle can be a personal or commercial truck, minivan, or other suitable vehicle with gasoline, diesel, electric, or other forms of propulsion for transporting the object along with any number of passengers or no passengers. The vehicle 10 can have other suitable storage areas, and the universal storage system can be integrated in any combination of these storage areas for use in combination with or independent of any peer-to-peer ridesharing or parcel delivery applications.

Figure 2:
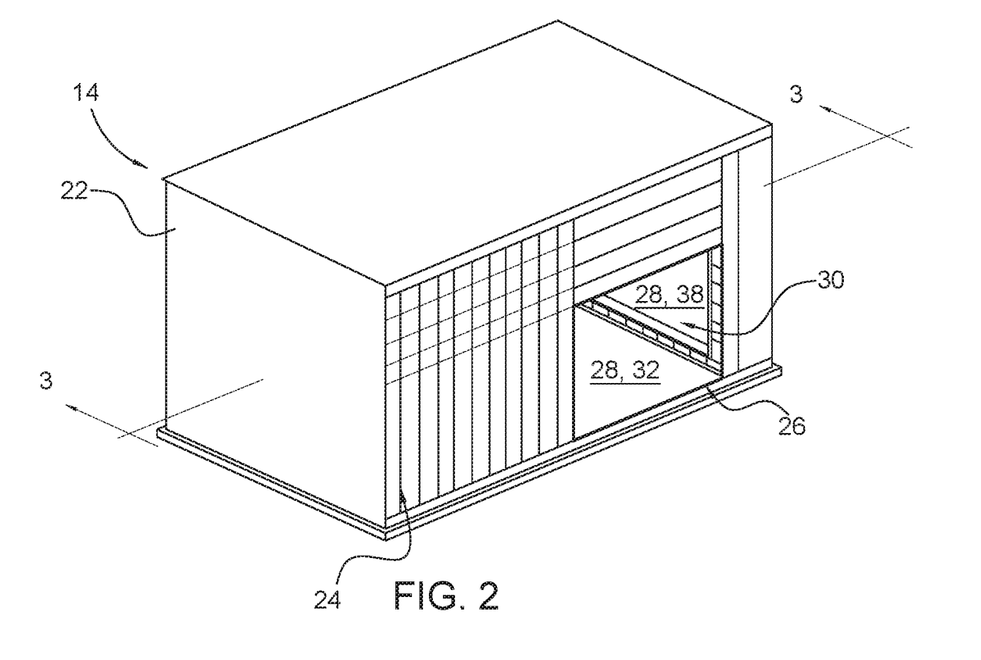
FIG. 2 is a perspective view of one of the universal storage systems of FIG. 1, illustrating the system including an enclosure having one or more compartments and a cover mechanism for selectively uncovering one or more of the compartments.
Figure 3:
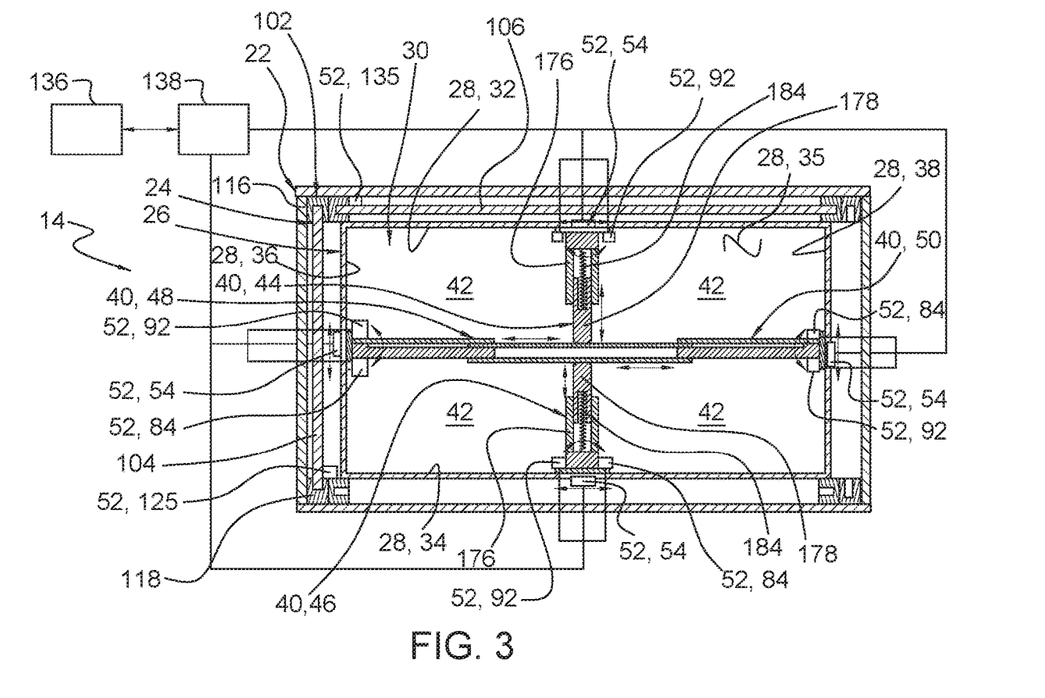
FIG. 3 is a cross-sectional view of the universal storage system of FIG. 2 as taken along line 3-3, illustrating the system having multiple partition actuators for moving associated partitions and multiple cover actuators for moving the associated cover elements.

Referring to FIGS. 2 and 3, in this example, the system 14 includes an outer housing 22, a cover mechanism 24 disposed within the outer housing 22, and an enclosure 26 (FIG. 3), which is disposed within the cover mechanism 24. As shown in FIG. 3, the enclosure 26 has one or more surfaces 28 defining a chamber 30. In this example, the surfaces 28 include a top surface 32, a bottom surface 34 spaced from the top surface 32, a rear wall surface 35 extending between the top and bottom surfaces 32, 34, and first and second side wall surfaces 36, 38 extending between the top and bottom surfaces 32, 34. These surfaces are planar for defining the chamber 30 with a predetermined cubic volume. In other embodiments, the surfaces can include more or fewer than five surfaces, and these surfaces may be planar concave, convex, stepped with recesses, or otherwise non-planar. As but one example, a single continuously concave surface can be used to define a hemispherical chamber.

Figure 4:
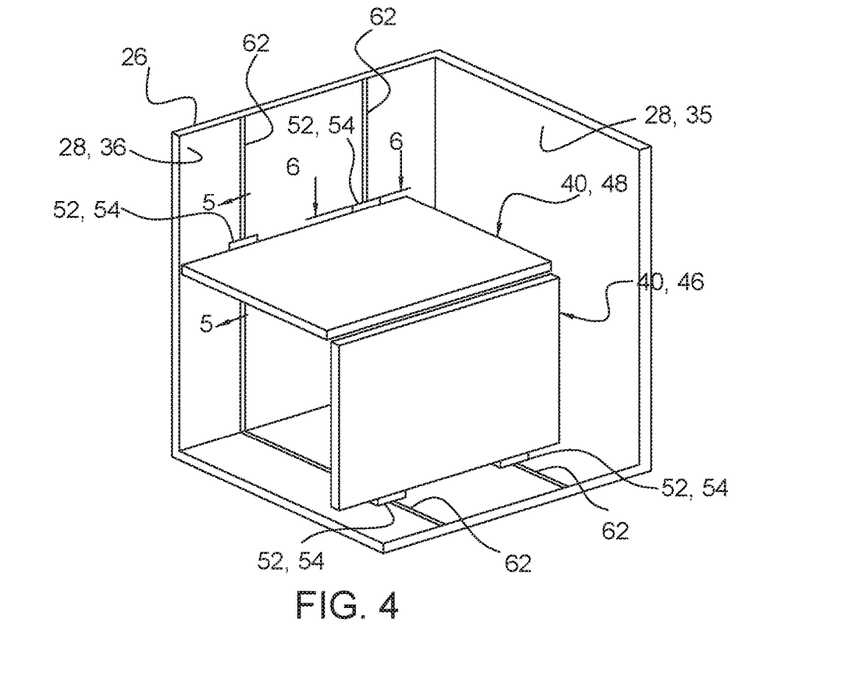
FIG. 4 is an enlarged perspective cutaway view of a portion of the universal storage system of FIG. 3, illustrating two of the partitions.

Referring to FIGS. 3 and 4, the enclosure 26 includes a plurality of partitions 40 movable within the chamber 30 to define one or more compartments 42 that are adapted to hold luggage, parcels, or other items of various sizes that in aggregate can be stored within the chamber 30. The partitions 40 include one or more panels connected to the enclosure 26 and displaceable along the associated surfaces 28. In this example, the partitions 40 include a first, second, third, and fourth panels 44, 46, 48, 50 connected to an associated one of the top, bottom, first sidewall, and second sidewall surfaces 32, 34, 36, 38. More specifically, the first panel 44 can be displaceable in a linear path along the top surface 32 of between the first and second sidewall surfaces 36, 38. The second panel 46 can be displaceable in a linear path along the bottom surface 34 of between the first and second sidewall surfaces 36, 38. The third panel 48 can be displaceable in a linear path along the first sidewall surface 36 of between the top and bottom surfaces 32, 34. The fourth panel 50 can be displaceable in a linear path along the second sidewall surface 38 of between the top and bottom surfaces 32, 34. It is contemplated that any one or more of the panels can be displaceable in a linear or non-linear path along any of the associated surfaces and between any two panels. In addition, it is contemplated that the partitions can include more or fewer than four panels.

Referring to FIGS. 3-6, the system 14 includes a plurality of partition actuators 52 coupled to the partitions 40 for moving the partitions 40 within the chamber 30 to define one or more compartments 42. Continuing with the previous example, the partition actuators 50 includes a plurality of sliding drive elements 54 coupled to an associated one of the first, second, third, and fourth panels 44, 46, 48, 50. The sliding drive elements 54 are configured to displace the first, second, third, and fourth panels 44, 46, 48, 50 along an associated one of the top, bottom, and first and second sidewall surfaces 32, 34, 36, 38.

Figure 5:
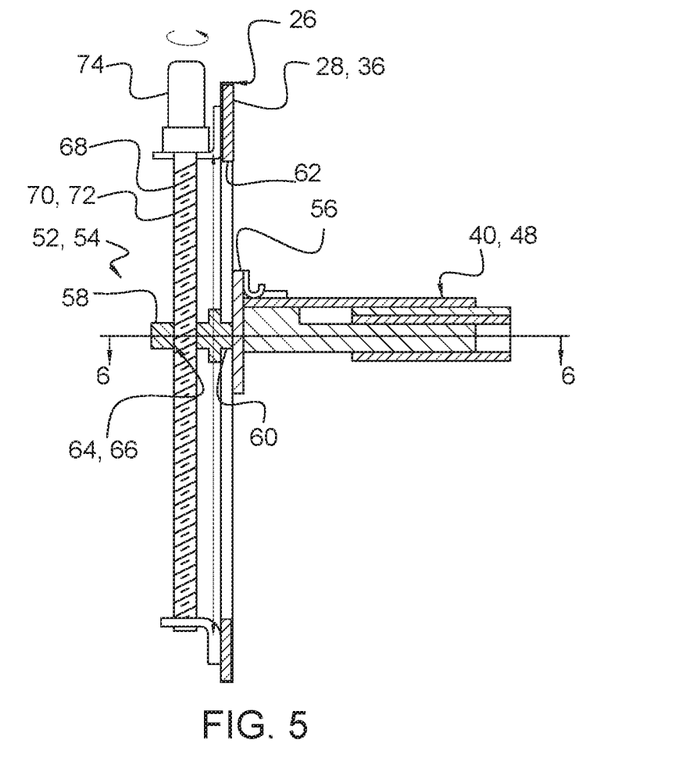
FIG. 5 is a cross-sectional view of the universal storage system of FIG. 4 as taken along line 5-5, illustrating the partition actuator including a sliding drive element for moving the partition along a surface of the enclosure.
Figure 6:
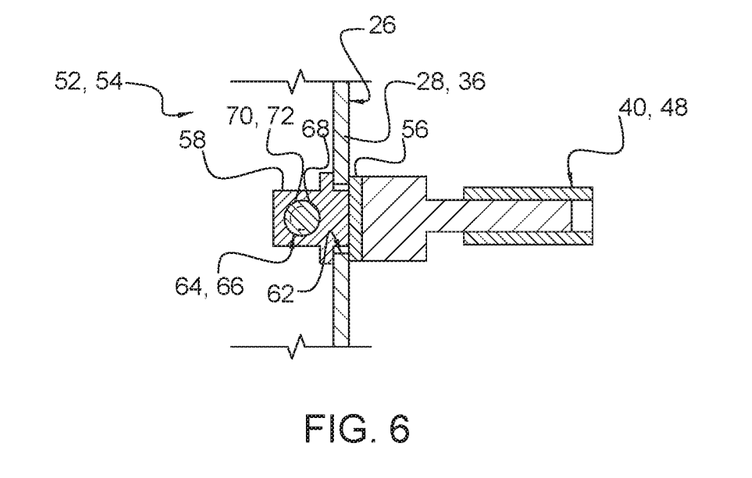
FIG. 6 is a cross-sectional view of the universal storage system of FIG. 4 as taken along line 6-6.

As best shown in FIGS. 5 and 6, each sliding drive element 54 includes a mount 56 disposed within the chamber 30 for supporting the associated partition. Each sliding drive element 54 further includes a carrier 58 having a neck 60 that extends through an elongated slot 62 formed in the enclosure 26 and is attached to the mount 56. The carrier 58 further includes an opening 64 having internal threading 66. The sliding drive element 54 further includes a threaded drive element 68 rotatably attached to the enclosure 26 and extending along the slot 62. The threaded drive element 68 can be an elongated bolt with an outer diameter surface 70 forming external threading 72 that engages the internal threading 66 of the carrier 58 such that rotation of the threaded drive element 68 in one rotational direction moves the carrier 58 and the partition 40 in one linear direction along the slot 62 and rotation of the threaded drive element 68 in the opposite rotational direction moves the carrier 58 and the partition 40 in the opposite linear direction along the slot 62. The sliding drive element 54 further includes a motor 74 for rotating the threaded drive element 68 in the forward and reverse rotational directions. While each of the sliding drive elements is identical to the sliding drive element 54 shown in FIGS. 5 and 6, the sliding drive elements can be any suitable actuator configured to move the partition along the surface of the enclosure 26 in a linear or non-linear path. It is also contemplated that the sliding drive elements can be different from one another.

Figure 7:
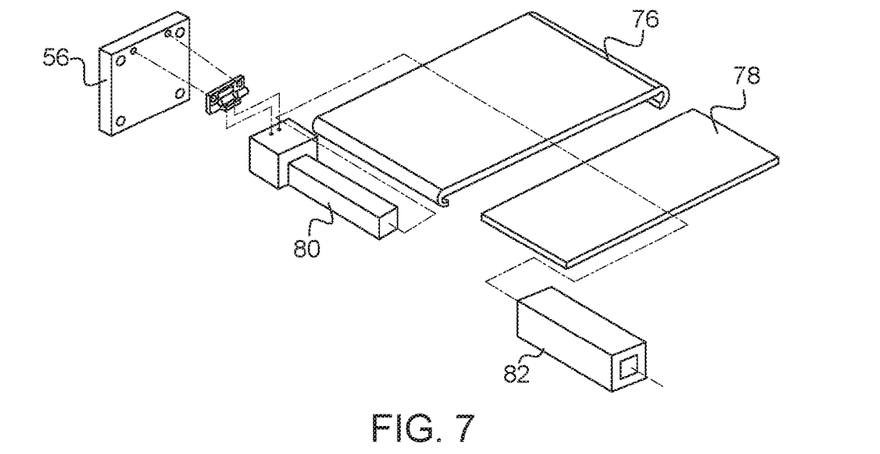
FIG. 7 is an exploded view of one of the partitions of FIG. 3.
Figure 8:
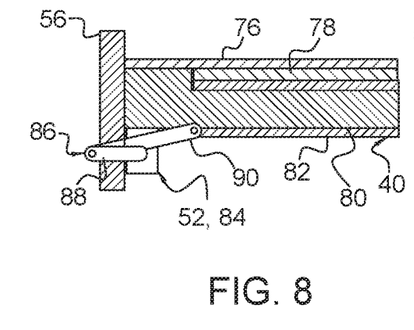
FIG. 8 is a cross-sectional view of the partition of FIG. 4 as taken along line 5-5, illustrating the partition disposed in a retracted position.
Figure 9:
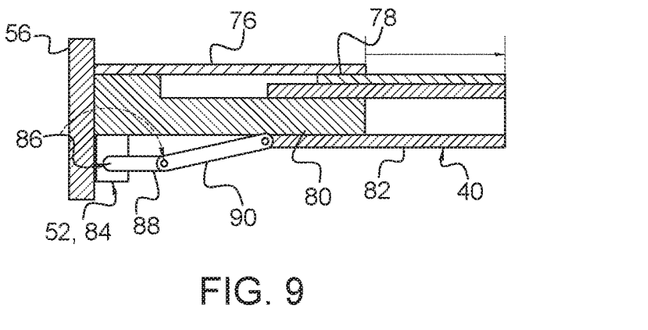
FIG. 9 is a cross-sectional view of the partition of FIG. 4 as taken along line 5-5, illustrating the partition actuator including an extension drive element for moving the partition from the retracted position to an extended position.

Referring to FIGS. 7-9, each of the panels 40 includes a first plate 76 and a second plate 78 coupled to the first plate 76. The second plate 78 is movable between a retracted position (FIG. 8) and an extended position (FIG. 9) relative to the first plate 76 for changing a length of the associated panel. In this example, each panel includes both the first plate 76 and a post 80 attached to the mount 56. Each panel further includes a tube 82, which is attached to the second plate 78 and telescopically fitted to the post 80. In this example, the partition actuators 52 include an extension drive element 84 coupled to the tube 82 and the second plate 78 for moving the second plate between the retracted and extended positions. More specifically, the extension drive element 84 includes a two-bar linkage 86 having a first arm 88 cranked by the motor and a second arm 90, which has one end pivotably attached to the first arm 88 and an opposite end pivotably attached to the tube 82. While each of the extension drive elements may be identical to the extension drive element 84 shown in FIGS. 7-9, the extension drive elements can be any suitable actuator configured to move the second plate, and the extension drive elements can be different from one another. For example, as shown in FIG. 3, each of the first and second panels 44, 46 may include a first plate 176 coupled to an associated one of the top and bottom surfaces 32, 34 of the enclosure, and a second plate 178 may be telescopically attached to the first plate 176 with a spring 184 biasing the second plate 178 toward the extended position so as to passively lengthen the partition. The second plate 178 may include chamfered edges for engaging the third and fourth panels 48, 50 and moving the second plate 178 toward the retracted position. In other examples, one or more of the partitions can have a fixed length.

Figure 10:
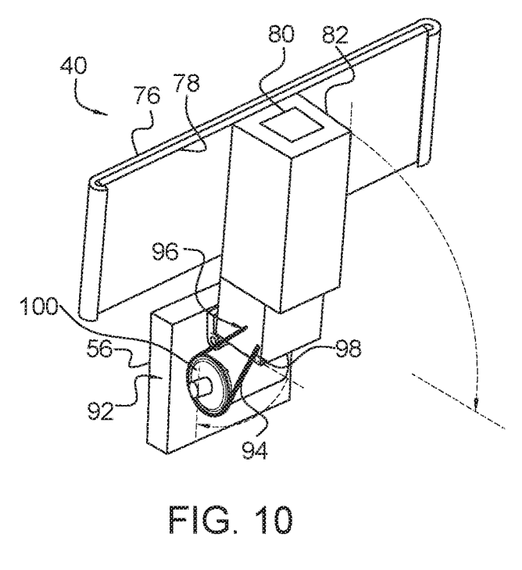
FIG. 10 is an enlarged perspective view of one portion of the partition of FIG. 3, illustrating the partition disposed in a folded position.
Figure 11:
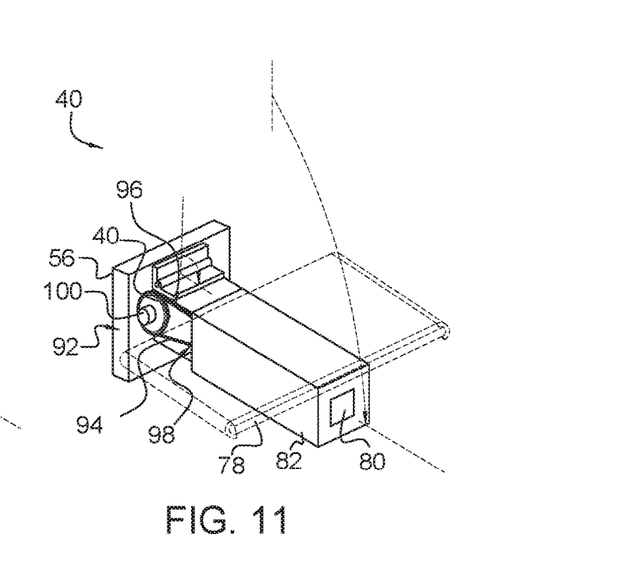
FIG. 11 is an enlarged perspective view of one portion of the partition of FIG. 10, illustrating the partition actuator having a pivoting drive element for angularly moving the partition relative to the enclosure from a folded position to an unfolded position.

Referring to FIGS. 10 and 11, one or more of the panels 40 is angularly movable relative to the associated surfaces 28 (FIG. 3). In this example, each one of the first, second, third, and fourth panels 44, 46, 48, 50 are configured to move angularly relative to an associated one of the top, bottom, and first and second sidewall surfaces 32, 34, 36, 38. However, it is contemplated that fewer than all panels may be angularly movable relative to the surfaces of the enclosure.

The partition actuators 40 may further include a plurality of pivoting drive elements 92 coupled to an associated one of the first, second, third, and fourth panels 44, 46, 48, 50. The pivoting drive elements 92 are configured to angularly move the first, second, third, and fourth panels 44, 46, 48, 50 relative to an associated one of the top, bottom, and first and second sidewall surfaces 32, 34, 36, 38. More specifically, in this example, each pivoting drive element 92 can include be a chain 94 with opposing ends 96, 98 attached to the tube 82. The pivoting drive element 92 can further include a sprocket 100 attached to the mount 56 and engaged with the chain 94, such that rotation of the sprocket in one rotational direction angularly moves the panel 40 toward a folded position where the panel 40 is disposed parallel with and adjacent to the associated surface 28 of the enclosure 26. In addition, rotation of the sprocket in the opposite rotational direction angularly moves the panel 40 to the unfolded position where the end of the panel is distal from the associated surface 28. While each of the pivoting drive elements may be identical to the pivoting drive element 92 shown in FIGS. 10 and 11, the pivoting drive elements can be any suitable partition actuator configured to move the panel 40 between the folded and unfolded positions, and the pivoting drive elements can be different from one another. For example, the partition actuator may be a torsional spring that passively moves the panel to the unfolded position.

Figure 12A:
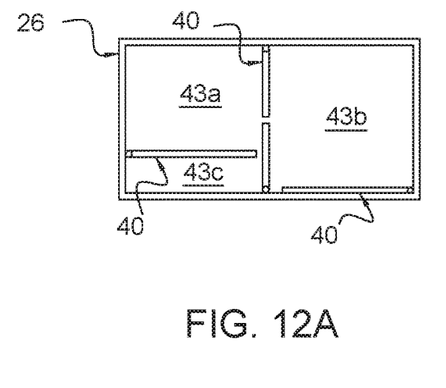
FIG. 12A is a cross-sectional view of the enclosure of FIG. 3, with the partitions moved to associated positions to divide the chamber into three unequal compartments.
Figure 12B:
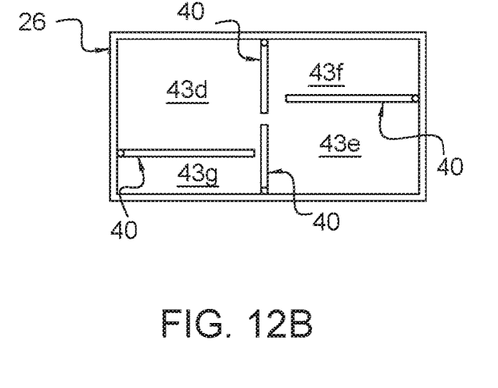
FIG. 12B is a cross-sectional view of the enclosure of FIG. 3, with the partitions moved to associated positions to divide the chamber into four compartments.
Figure 12C:
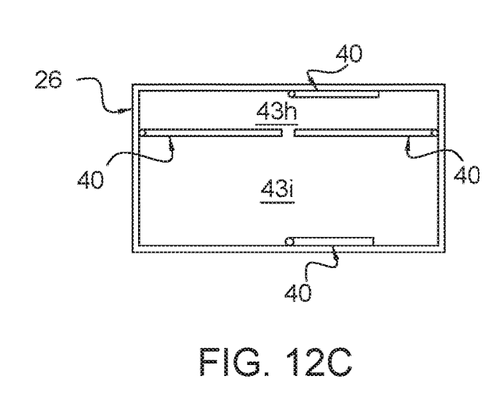
FIG. 12C is a cross-sectional view of the enclosure of FIG. 3, with the partitions moved to associated positions to divide the chamber into two unequal compartments, with each compartment having a height-to-width ratio that is less than one.
Figure 12D:
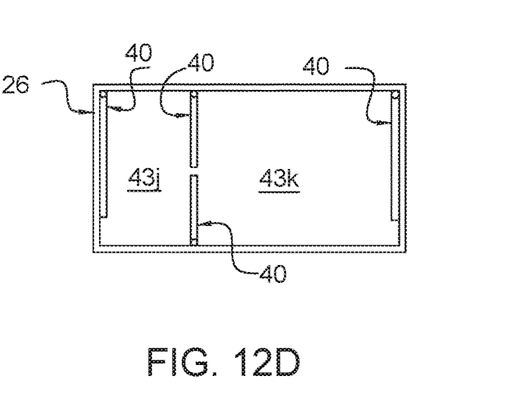
FIG. 12D is a cross-sectional view of the enclosure of FIG. 3, with the partitions moved to associated positions to divide the chamber into two unequal compartments, with each compartment having a height-to-width ratio that is above one.
Figure 12E:
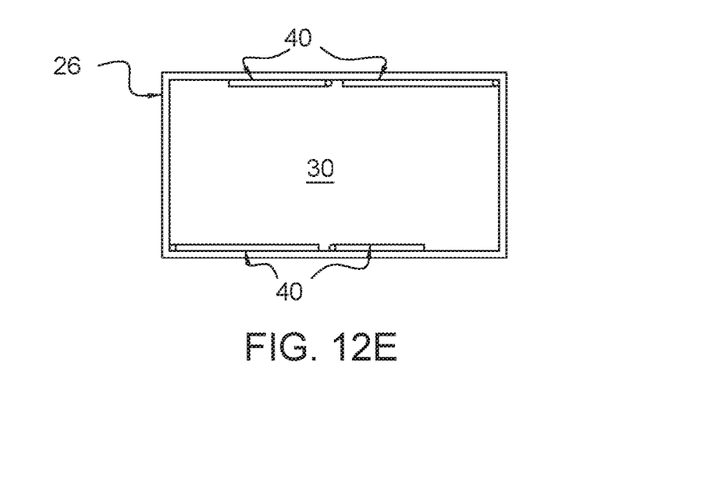
FIG. 12E is a cross-sectional view of the enclosure of FIG. 3, with all the partitions moved to folded positions to avoid dividing the chamber into multiple compartments.

Referring to FIGS. 12A-12E, the partition actuators may move the partitions 40 to various positions to define any number of compartments with suitable sizes for receiving the corresponding luggage, parcels, and other items. More specifically, as shown in FIG. 12A, the partitions 40 may be moved to divide the chamber 30 into three unequal compartments 43a, 43b, 43c. As shown in FIG. 12B, the partitions 40 may be moved to divide the chamber 30 into four compartments 43d, 43e, 43f, 43g, with two equally sized compartments 43d, 43e being larger than the other two compartments 43f, 43g. As shown in FIG. 12C, the partitions 40 may be moved to divide the chamber 30 into two unequally sized compartments 43h, 43i, with each compartment having a height-to-width ratio that is less than one. As shown in FIG. 12D, the partitions 40 may be moved to divide the chamber 30 into two unequally sized compartments 43j, 43k, with each of the compartments having a height-to-width ratio that is above one. As shown in FIG. 12E, the partitions 40 may be moved to folded positions or otherwise positioned adjacent to one of the surfaces 28 of the enclosure 26 to avoid dividing the chamber 30 and to permit one object to be held in the entire chamber 26. It is contemplated that the panels can be moved to other positions for defining any suitable shape, size, and number of compartments.

Figure 13:
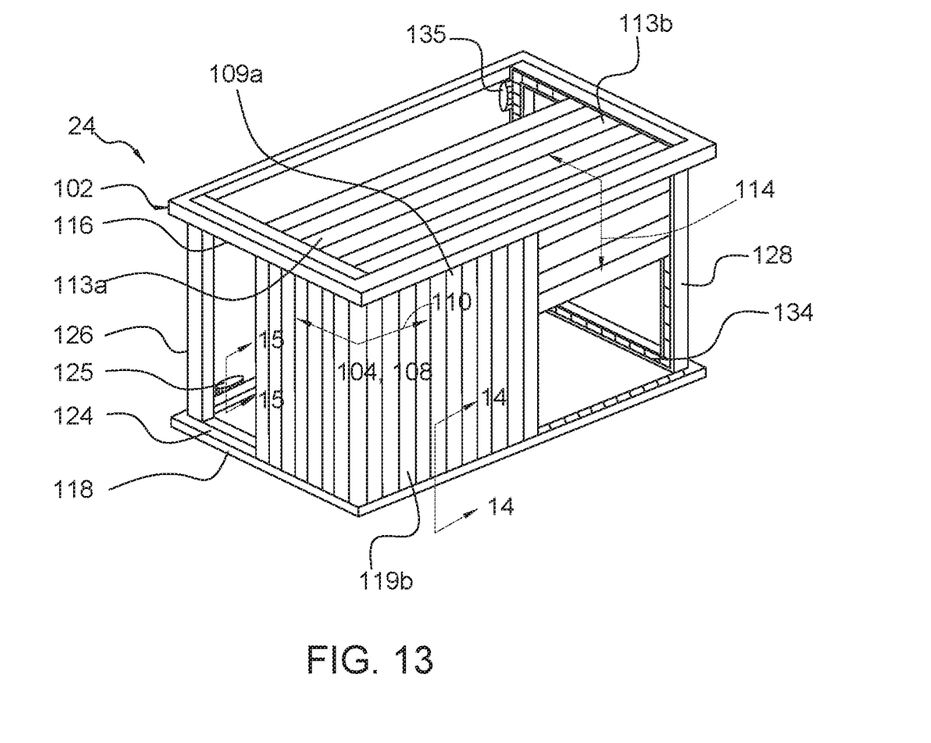
FIG. 13 is an enlarged perspective view of the cover mechanism of FIG. 2, illustrating the cover mechanism including a frame, first and second cover elements movable relative to the frame, and first and second door drive elements for moving the first and second cover elements.
Figure 14:
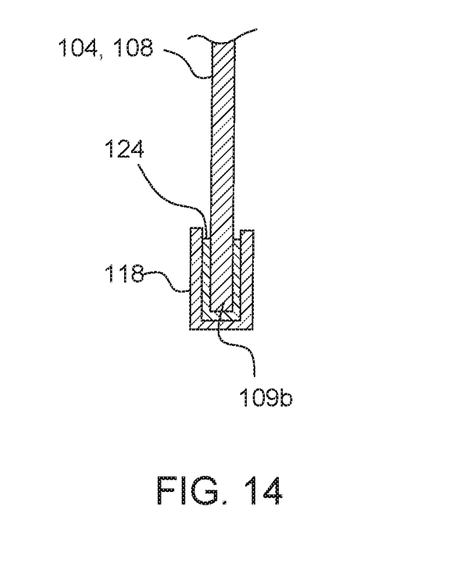
FIG. 14 is a cross-sectional view of the cover mechanism of FIG. 13 as taken along line 14-14, to illustrate one portion of the first door drive element for moving the first cover element.
Figure 15:
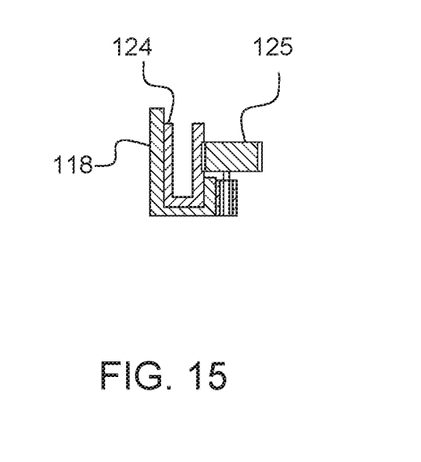
FIG. 15 is a cross-sectional view of the cover mechanism of FIG. 13 as taken along line 15-15, to illustrate another portion of the first door drive element.

Referring now to FIGS. 13-15, the cover mechanism 24 includes a frame 102 and two or more cover elements 104, 106 movable relative to the frame 102 for covering the compartments. In this example, the cover elements 104, 106 include a first tambour door 108 movable relative to the frame 102 along a first direction 110 and a second tambour door 112 movable relative to the frame 102 along a second direction 114 where the first direction 110 is angularly spaced from the second direction 114 such that the first and second tambour doors 108, 112 are movable for covering at least one of the compartments.

Referring back to FIG. 3, the frame 102 includes a first pair of closed loop rails 116, 118 having sections adjacent to an open end of the chamber 30 and extending horizontally on opposite sides of the open end. The cover mechanism 24 further includes a first guide belt 124 (FIGS. 14 and 15) movable along each rail and a first door drive element 125 (FIG. 15) driving the guide belt 124 along the associated rail 116. The first tambour door 108 has a pair of opposing sides 109a, 109b engaged with and carried by the drive belt 124 in each of the rails 116, 118. Furthermore, the frame 102 includes a second pair of closed loop rails 126, 128 having sections adjacent to the open face of the chamber 30 and extending vertically on opposite sides of the open face. The cover mechanism 24 further includes a second guide belt 134 movable along each rail 126, 128 and a second door drive element 135 driving the guide belt 134 along the associated rail 126, 128. The second tambour door 112 has a pair of opposing sides 113a, 113b engaged with and carried by the drive belt 134 in each of the rails 126, 128.

Referring back to FIG. 3, the system 14 further includes a user interface 136 for generating a deposit signal indicative of a size of an object, such as luggage, packages, or other items, to be deposited into the enclosure 26. In this example, the user interface 136 can include a smartphone or a control panel attached to the enclosure. The users can include a sender and a recipient of the object, when the system 14 is used for delivering the object from the sender to the recipient. In addition, the user can be a single person who is both the sender and recipient when that person rides along with the object from the place of origin to the destination. It is contemplated that passenger may ride with the object for only a portion of the distance between the origin and the destination. In particular, the passenger and the object may have only a common origin with the passenger and the object being dropped off at different destinations, only a common destination with the passenger and the object being picked up at different origins, or neither where the passenger and the object have different origins and different destinations.

Referring again to FIG. 3, the system 14 further includes a controller 138 configured to receive the deposit signal from the user interface 136. In response to the controller 138 receiving the deposit signal, the controller 138 is configured to compare the size of the object to the remaining available space in the chamber 30. In response to the controller 138 determining that the chamber does not have the remaining available space for storing the object, the controller 138 is configured to transmit a notification signal to the user interface to indicate to the same to the user. In response to the controller 138 determining that the chamber 30 has the available space to receive the object, the controller 138 is configured to generate a first actuation signal associated with a plurality of predetermined positions of the partitions to define a compartment that is sized for receiving the object. One or more partition actuators move the associated partitions to the predetermined positions in response to the partition actuators 52 receiving the first actuation signal from the controller 138. In further response to the controller 138 determining that the chamber 30 has the available space to receive the object, the controller 138 is configured to generate a second actuation signal associated with a plurality of predetermined locations of the cover elements for uncovering the compartment 42. One or more cover actuators 52 move the associated cover elements 104, 106 to the predetermined locations in response to the cover actuators 52 receiving the second actuation signal from the controller 138. In addition, the controller 138 is configured to generate a compartment access code associated with the second actuation signal and transmit the compartment access code to at least the sender depositing the object in the associated compartment and the recipient retrieving the object from the compartment. The controller 138 is further configured to generate the second actuation signal in response to the user interface receiving the compartment access code from the sender.

Figure 16:
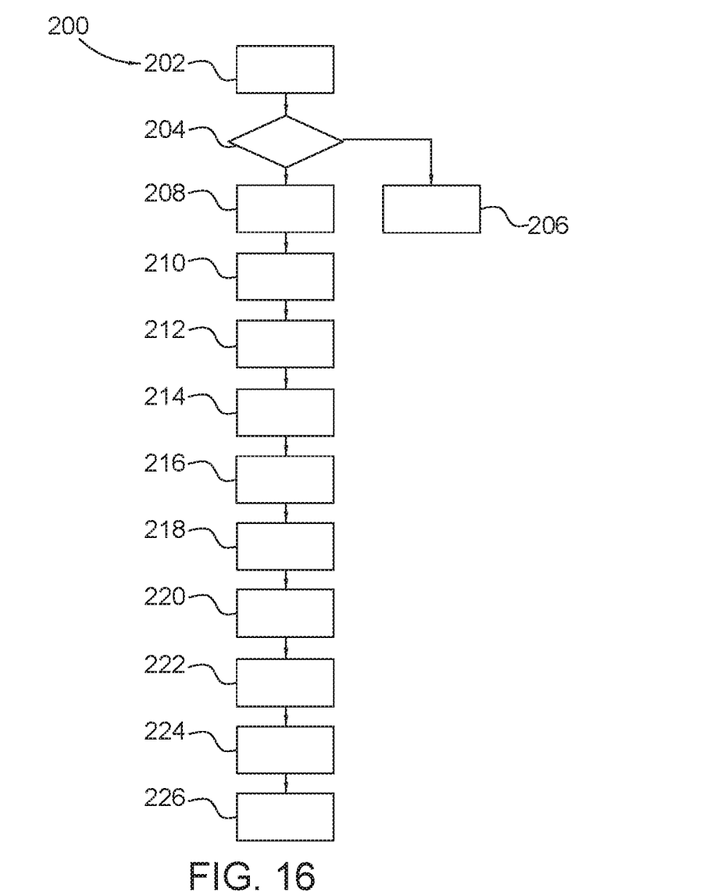
FIG. 16 is a flowchart for a method of operating the system of FIG. 1.

Referring to FIG. 16, there is illustrated a flowchart for one example of a method for operating the universal storage system of FIGS. 1-15. The method 200 commences at block 202 with the sender operating the user interface 136 to input a request for delivering the object from a point of origin to a destination, with the request indicating the size of the object. The request may also include a request for transporting a passenger for at least a portion of the distance that the object is being transported. In this example, the user interface 136 generates the deposit signal indicative of the size of the object to be deposited into the enclosure.

At block 204, the controller receives the deposit signal from the user interface and compares the size of the object to the available space in the chamber 30. If the controller determines that the chamber does not have space available for storing the object, the method proceeds to block 206. If the controller determines that the chamber has space available for storing the object, the method proceeds to block 208.

At block 206, the controller 138 transmits a notification signal to the user interface to indicate to the user that the chamber does not have space available for storing and transporting the object. In another embodiment, it is contemplated that the method 200 may return to step 204 with the controller of a comparing the size of the object to the available space in the chamber associated with the storage system of another vehicle.

At block 208, the controller generates a first actuation signal associated with a plurality of predetermined positions of the partitions to define a compartment that is sized for receiving the object.

At block 210, partition actuators move the partitions to the predetermined positions in response to the partition actuators receiving the first actuation signal from the controller 138.

At block 212, the controller 138 generates a compartment access code associated with a second actuation signal for moving the cover elements to predetermined locations for uncovering the compartment storing the object, and the user interface 136 transmits the compartment access code to the sender depositing the object in the associated compartment and the recipient retrieving the object from the associated compartment. It is contemplated that the compartment access code can be transmitted to other suitable individuals, including but not limited to the driver of the vehicle.

At block 214, the vehicle arrives at the location of origin for the object, and the sender of the object inputs the compartment access code into the user interface 136, such that the user interface 136 transmits the deposit signal to the controller 138.

At block 216, the controller 138 generates the second actuation signal in response to the controller 138 receiving the deposit signal from the user interface 136.

At block 218, the cover actuator moves the cover elements to the predetermined locations for uncovering the compartment for storing the object, in response to the cover actuator receiving the second actuation signal from the controller.

At block 220, the vehicle travels from the point of origin for the object to the destination for the object, and the recipient of the object operates the user interface to input the compartment access code.

At block 222, the user interface 136 generates a retrieve signal in response to the user interface receiving the compartment access code from the recipient.

At block 224, the controller generates the second actuation signal in response to the user interface receiving the compartment access code from the recipient.

At block 226, the cover actuator moves the cover elements to the predetermined locations to uncover the compartment and the recipient retrieves the object from the compartment, in response to the cover actuator receiving the second actuation signal from the controller.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A universal storage system for a motor vehicle, the universal storage system comprising:
   an enclosure defining a chamber;
   a plurality of partitions movable within the chamber for defining at least one compartment;
   a partition actuator coupled to the partitions for moving the partitions within the chamber;
   a cover mechanism having a frame and at least two cover elements movable relative to the frame for covering the at least one compartment;
   a cover actuator for moving the cover elements;
   a user interface generating a deposit signal indicative of a size of an object to be deposited into the enclosure; and
   a controller configured to:
      receive the deposit signal from the user interface;
      generate a first actuation signal associated with a plurality of predetermined positions of the partitions to define a compartment that is sized for receiving the object, wherein the partition actuator moves the partitions to the predetermined positions in response to the partition actuator receiving the first actuation signal from the controller; and generate a second actuation signal associated with a plurality of predetermined locations of the cover elements for uncovering the compartment, wherein the cover actuator moves the cover elements to the predetermined locations in response to the cover actuator receiving the second actuation signal from the controller.

2. The universal storage system of claim 1 wherein the enclosure comprises at least one surface defining the chamber, with the partitions connected to the at least one surface and displaceable along the at least one surface.

3. The universal storage system of claim 2 wherein the at least one surface comprises:
a top surface;
a bottom surface spaced from the top surface;
a rear wall surface extending between the top and bottom surfaces; and
first and second side wall surfaces extending between the top and bottom surfaces;
wherein the partitions comprise:
a first panel connected to the top surface and displaceable along the top surface;
a second panel connected to the bottom surface and displaceable along the bottom surface;
a third panel connected to the first sidewall surface and displaceable along the first sidewall surface; and
a fourth panel connected to the second sidewall surface and displaceable along the second sidewall surface.

4. The universal storage system of claim 3 wherein the partition actuator includes a plurality of sliding drive elements coupled to an associated one of the first, second, third, and fourth panels, where the sliding drive elements are configured to displace the first, second, third, and fourth panels along an associated one of the top, bottom, and first and second sidewall surfaces.

5. The universal storage system of claim 3 wherein the cover elements comprises a first tambour door movable relative to the frame along a first direction and a second tambour door movable relative to the frame along a second direction where the first direction is angularly spaced from the second direction such that the first and second tambour doors are movable for covering at least one of the compartments.

6. The universal storage system of claim 5 wherein the cover actuator comprises first and second door drive elements for moving an associated one of the first and second tambour doors.

7. The universal storage system of claim 5 wherein the first, second, third, and fourth panels are configured to move angularly relative to an associated one of the top surface, the bottom surface, the first sidewall surface, and the second sidewall surface.

8. The universal storage system of claim 7 wherein the partition actuator includes a plurality of pivoting drive elements coupled to an associated one of the first, second, third, and fourth panels, where the pivoting drive elements are configured to angularly move the first, second, third, and fourth panels relative to an associated one of the top, bottom, and first and second sidewall surfaces.

9. The universal storage system of claim 7 wherein each of the first, second, third, and fourth panels comprises:
a first plate; and a second plate coupled to the first plate, with the second plate movable between a retracted position and an extended position relative to the first plate for changing a length of the associated panel.

10. The universal storage system of claim 9 wherein the partition actuator includes an extension drive element coupled to the second plate for moving the second plate between the retracted position and the extended position.

11. A universal storage system for a motor vehicle, the universal storage system comprising:
an enclosure defining a chamber;
a plurality of partitions movable within the chamber for defining at least one compartment;
a partition actuator coupled to the partitions for moving the partitions within the chamber;
a cover mechanism having a frame and at least two cover elements movable relative to the frame for covering the at least one compartment;
a cover actuator for moving the cover elements;
a user interface generating a deposit signal indicative of a size of an object to be deposited into the enclosure; and
a controller configured to:
receive the deposit signal from the user interface;
generate a first actuation signal associated with a plurality of predetermined positions of the partitions to define a compartment that is sized for receiving the object, wherein the partition actuator moves the partitions to the predetermined positions in response to the partition actuator receiving the first actuation signal from the controller;
generate a second actuation signal associated with a plurality of predetermined locations of the cover elements for uncovering the compartment, wherein the cover actuator moves the cover elements to the predetermined locations in response to the cover actuator receiving the second actuation signal from the controller;
generate a compartment access code associated with the second actuation signal;
transmit the compartment access code to a sender and a recipient; and
generate the second actuation signal in response to the user interface receiving the compartment access code from the sender;
wherein the user interface is configured to generate a retrieve signal in response to the user interface receiving the compartment access code from the recipient;
wherein the controller is configured to generate the second actuation signal in response to the controller receiving the retrieve signal from the user interface.

12. The universal storage system of claim 11 wherein the controller is configured to compare the size of the object to available space in the chamber, in response to the controller receiving the deposit signal, and wherein the controller generates the first actuation signal in response to the controller determining that the object can be stored in the available space of the chamber.

13. The universal storage system of claim 11 wherein the enclosure has at least one surface defining the chamber, and wherein the partitions include at least one panel connected to the enclosure and displaceable along the associated surface.

14. The universal storage system of claim 13 wherein the at least one panel is further angularly movable relative to the at least one surface.

15. The universal storage system of claim 14 wherein the panel includes a first plate and a second plate coupled to the first plate, with the second plate movable between a retracted position and an extended position relative to the first plate for changing a length of the panel.

16. A method for operating a universal storage system having an enclosure defining a chamber, a plurality of partitions, a partition actuator, a cover mechanism having at least two cover elements, a cover actuator, a user interface, and a controller, the method comprising the steps of:
generating, using a user interface, a deposit signal indicative of a size of an object to be deposited into the enclosure;
receiving, using the controller, the deposit signal from the user interface;
generating, using the controller, a first actuation signal associated with a plurality of predetermined positions of the partitions to define a compartment that is sized for receiving the object;
moving, using the partition actuator, the partitions to the predetermined positions in response to the partition actuator receiving the first actuation signal from the controller;
generating, using the controller, a second actuation signal associated with a plurality of predetermined locations of the cover elements for uncovering the compartment used for holding the object; and
moving, using the cover actuator, the cover elements to the predetermined locations in response to the cover actuator receiving the second actuation signal from the controller.

17. The method of claim 16 further comprising:
comparing, using the controller, the size of the object to available space in the chamber, in response to the controller receiving the deposit signal; and
generating, using the controller, the first actuation signal in response to the controller determining that the object can be received within the available space of the chamber.

18. The method of claim 17 further comprising:
generating, using the controller, a compartment access code associated with the second actuation signal; and
transmitting, using the user interface, the compartment access code to a sender and a recipient.

19. The method of claim 18 further comprising:
transmitting, using the user interface, the deposit signal to the controller in response to the user interface receiving the compartment access code from the sender; and
generating, using the controller, the second actuation signal such that the sender is capable of depositing the object in the compartment, in response to the controller receiving the deposit signal from the user interface.

20. The method of claim 19 further comprising:
generating, using the user interface, a retrieve signal in response to the user interface receiving the compartment access code from the recipient; and
generating, using the controller, the second actuation signal such that the recipient is capable of retrieving the object from the compartment, in response to the controller receiving the retrieve signal from the user interface.

* * * * *